United States Patent [19]

Tanuma

[11] Patent Number: 5,561,550
[45] Date of Patent: Oct. 1, 1996

[54] WAVELENGTH CONVERSION DEVICE INCLUDING AN UNSTABLE OPTICAL RESONATOR WITH CONCAVE MIRRORS

[75] Inventor: Ryohei Tanuma, Kanagawa, Japan

[73] Assignee: Fuji Electric Co., Ltd., Tokyo, Japan

[21] Appl. No.: 477,443

[22] Filed: Jun. 7, 1995

Related U.S. Application Data

[62] Division of Ser. No. 35,972, Mar. 23, 1993, Pat. No. 5,483,374.

[30] Foreign Application Priority Data

Mar. 24, 1992 [JP] Japan ................................ 4-65398

[51] Int. Cl.⁶ ........................................... G02F 1/37
[52] U.S. Cl. ........................ 359/330; 359/328; 372/22; 372/95; 372/108
[58] Field of Search ............................. 359/326–332; 385/122; 372/21, 22, 95, 98, 99, 101, 108

[56] References Cited

U.S. PATENT DOCUMENTS

| | | | |
|---|---|---|---|
| 3,969,687 | 7/1976 | Freiberg et al. | 372/95 |
| 4,360,925 | 11/1982 | Brosnan et al. | 372/95 |
| 4,717,842 | 1/1988 | Komine | 359/327 |
| 4,884,276 | 11/1989 | Dixon et al. | 372/21 |
| 4,951,294 | 8/1990 | Basu et al. | 372/21 X |
| 5,012,483 | 4/1991 | Reintjes et al. | 372/95 |
| 5,025,446 | 6/1991 | Kuizenga | 372/21 |
| 5,195,159 | 3/1993 | Uenishi et al. | 385/122 |
| 5,260,963 | 11/1993 | Baird et al. | 372/95 |
| 5,483,374 | 1/1996 | Tanuma | 359/328 |

*Primary Examiner*—John D. Lee
*Attorney, Agent, or Firm*—Brumbaugh, Graves, Donohue & Raymond

[57] ABSTRACT

An optical resonator which is unstable with respect to laser light whose wavelength is to be converted includes a pair of confocal, coaxial curved mirrors. A nonlinear optical medium, e.g., lithium niobate, is disposed between the mirrors. Laser light injected into the optical resonator becomes concentrated in the vicinity of the optical axis, for highly efficient wavelength conversion.

2 Claims, 3 Drawing Sheets

WAVELENGTH CONVERSION DEVICE INCLUDING AN UNSTABLE OPTICAL RESONATOR WITH CONCAVE MIRRORS

This is a division of application Ser. No. 08/035,972, filed on Mar. 23, 1993 (now U.S. Pat. No. 5,483,374).

BACKGROUND OF THE INVENTION

The present invention relates generally to a wavelength conversion device and more specifically to a wavelength conversion device that changes the wavelength of laser light by means of a nonlinear optical medium such as lithium niobate, for example.

Laser light generators or sources can produce coherent light with sharp directionality at high intensity. As a result, such sources are used in a wide variety of fields, e.g., the measuring, medical and processing fields, and in chemical industry. Most such sources produce light of a specific wavelength, which wavelength specificity limits their practical application. To overcome this limitation, laser wavelength conversion systems have been designed, using a nonlinear optical medium such as lithium niobate (LiNbO3), for example. One system with particular practicality is the second harmonic generation (SHG) system, which can halve the wavelength of laser light, and the optical parametric oscillation (OPO) system, which can increase wavelength. These systems employ a resonator, either internal or external to the laser light source, having end mirrors between which a nonlinear optical medium is inserted. Typical examples of such systems will be described with reference to FIGS. 6–8.

FIG. 6 shows a laser light source 10 and a nonlinear optical medium 20 in a resonant system for changing laser light L1 oscillated in the system to laser light L2 with half the wavelength of light L1 by second-harmonic generation. A laser medium 1 uses a YAG rod containing a laser-active substance such as Nd ions which are excited with exciting light EL generated by an exciting light source 2, producing laser light L1 with a wavelength of 1.06 μm, for example. The laser resonant system for the light includes a total-reflection mirror 3 and a partial-reflection mirror 4. The laser light L1 in this system is passed through the nonlinear optical medium 20 and changed to a laser light L2 with a wavelength 0.53 μm, which is the second harmonic based on the original light L1. The converted light is removed through the partial mirror 4. The second harmonic is generated as a secondary polarization wave according to the nonlinear optical coefficient of the medium, from the electric field of the primary polarization, using the incident laser light L1 to the nonlinear optical medium 20 as the fundamental wave. Because the secondary polarization is smaller than the primary polarization but proportional to the square of the electric field, it is necessary to strengthen the electric field to obtain a strong second harmonic. To this end, the laser light L1 is contained in the resonant system so that the intensity applied to the nonlinear optical medium 20 can be increased.

Another prior-art example, shown in FIG. 7, is also of a second-harmonic generation system, wherein a resonator 30 with a pair of mirrors 31 and 32 is provided on the outer side of a laser light source 10, within which the nonlinear optical medium 20 is disposed to pass the laser light L1 in only one direction from the laser light source 10 to an external resonator 30 via an isolator 5. The two mirrors 31 and 32 have high reflectivity for the laser light L1 and confine the laser light L1 in the resonator (30) to intensify the fundamental wave traveling through the nonlinear optical medium 20. The distance between the two mirrors 31 and 32 is adjusted so that the phase of the light reflected at the mirror 31 is opposite to the phase of the light reflected at the mirror 32. In this condition, the external resonator 30 has high transmittance for the laser light L1. Using the laser light L1 confined in the resonator as the fundamental wave, the converted laser light L2, which is the second harmonic of the laser light L1, is generated in the nonlinear optical medium 20. Mirror 31 is highly reflective and mirror 32 is highly permeable for the light L2, for removal of the light L2 through the mirror 32.

With reference to FIGS. 6 and 7, if the refractive index of the nonlinear optical medium 20 for the laser light L1 is different from that for the laser light L2, the laser light L1 and the laser light L2 propagate with different velocities. Then, the laser light L2 is generated with different phase at different locations in the optical medium 20 depends on the location in the medium, leading to reciprocal cancellation and reduction of wavelength conversion efficiency. To raise the conversion efficiency, it is necessary to satisfy a phase-matching condition, $n_1=n_2$, i.e., the refractive indices $n_1$ and $n_2$ for light L1 and light L2 in the nonlinear optical medium 20 are the same.

As the refractive index in an optical crystal depends on angle to the optical axis, the nonlinear optical medium 20 is cut so that this phase-matching condition is satisfied.

Another prior-art system, shown in FIG. 8, has a configuration similar to that in FIG. 7, wherein laser light L1 oscillating in the laser light source 10 through is changed through a nonlinear optical medium 20 in the external resonator 30, which is an optical parametric oscillator, to laser light L3 and L4, each with a wavelength longer than the wavelength of the laser light L1. This optical parametric oscillator also utilizes secondary polarization via the nonlinear optical medium 20. With ω1 denoting the angular frequency of the laser light L1, and with ω3 and ω4 denoting the respective angular frequencies of the converted laser light L3 and laser light L4, the condition $\omega_1=\omega_3+\omega_4$ is satisfied.

Improving the conversion efficiency of the optical parametric oscillation also requires that the phase-matching conditions described above be satisfied, the nonlinear optical medium 20 being cut to satisfy the phase-matching condition $n_1\omega_1=n_3\omega_3+n_4\omega_4$, where $n_3$ and $n_4$ are the respective refractive indices for the light L3 and the light L4. While this allows both of converted laser light L3 and laser light L4 to be generated, satisfying this phase-matching condition is difficult in practice. As a result, only one of them is generated in many cases.

SUMMARY OF THE INVENTION

The above-described conventional systems can be improved upon with respect to wavelength conversion efficiency and operational stability, especially for high-power laser light.

A preferred embodiment of the invention includes an unstable optical resonator comprising a pair of curved mirrors, which have the same optical axis and focal point, and a nonlinear optical medium disposed in the light path between the mirrors in the optical resonator. Laser light is concentrated in the vicinity of the optical axis.

The unstable optical resonator is similar to a stable optical resonator in that both confine incident light, but differs in that this confinement is not permanent in the unstable optical resonator, as the confined light is eventually released outside. Of the curved mirrors, one may be convex and the other concave. Alternatively, both mirrors may be concave. Conveniently, laser light is injected onto a concave mirror, in a direction parallel to the optical axis. Preferably, for concentrating laser light in the vicinity of the optical axis, the mirrors should have reflective surfaces which are axially or rotationally symmetrical with respect to the optical axis.

Preferably, input laser light having a wavelength to be converted is first converted into an annular light flux which is then injected into the optical resonator by an annular mirror. Preferably also, injection of laser light involves reflection by a wavelength-selective mirror through which wavelength-converted laser output light passes essentially unhindered. Alternatively, one of the curved mirrors of the optical resonator may be wavelength selective, allowing passage of converted light. In this case, in a particularly convenient embodiment, laser light is injected onto a circumferential portion of a curved mirror. Devices of the invention can be used in second-harmonic generation systems as well as in optical parametric systems.

BRIEF DESCRIPTION OF THE DRAWINGS

Other objects, features and advantages of the invention will become apparent, and its construction and operation better understood, from the following detailed description when read in conjunction with the accompanying drawings, in which.

DETAILED DESCRIPTION OF PREFERRED EMBODIMENTS

Typically, prior-art internal as well as external resonant systems use a stable optical resonator, which internally confines light permanently, so to speak, but which does not concentrate the light in any specific region. Rather, the light is distributed evenly across the mirror faces. Moreover, as the wave front of resonant light in a stable optical resonator is parallel to the mirror surface, and as there is a single phase at each point, a phase-resonant condition is satisfied for a specific wavelength at each point of the mirror face. For resonance of light with a different wavelength, it will be necessary to change the distance between the two mirrors.

Figure 6:
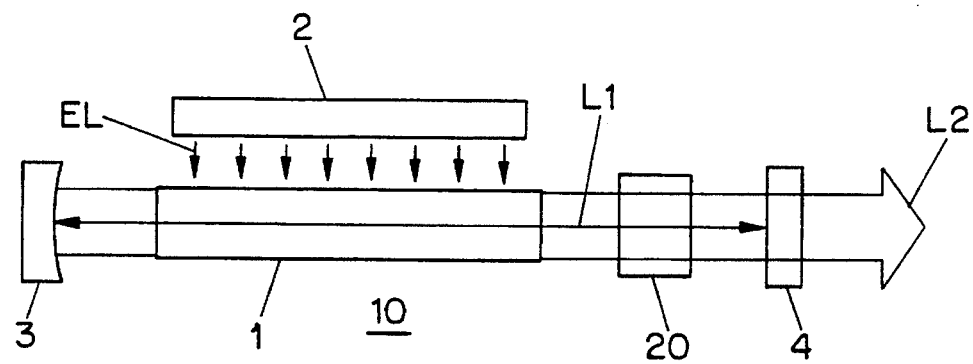
FIG. 6 is a schematic of a first conventional wavelength conversion device for second harmonic generation.

In the prior-art second-harmonic generation system of the internal resonance type, shown in FIG. 6, losses are created on both sides of the nonlinear optical medium 20 inserted in the laser resonant system of the laser light source 10 each time the laser light L1 passes through the medium. These losses reduce the oscillation efficiency for the laser light L1, and the effective wavelength conversion efficiency tends to decrease since the intensity of the converted laser light L2 decreases as the oscillation efficiency for the laser light L1 is reduced. Therefore, practical use of the internal resonant system in FIG. 6 is limited to low output operations which use a semiconductor laser as an excited light source 2. However, even in this case, the wavelength conversion efficiency tends to decrease noticeably when the laser light source 10 is operated continuously.

Figure 7:
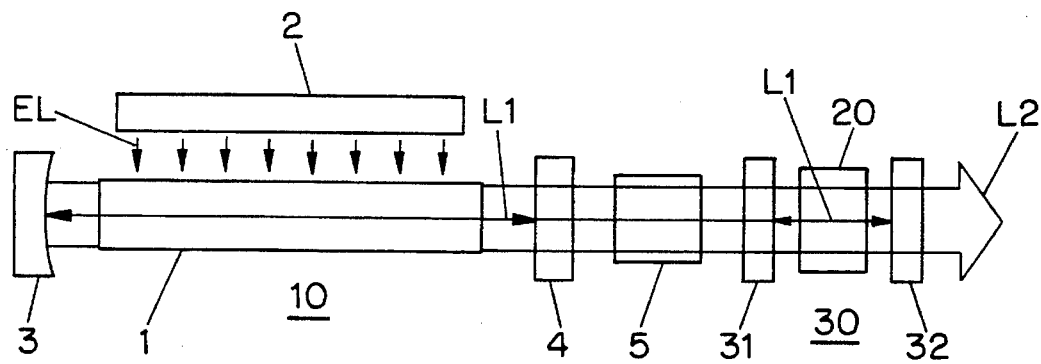
FIG. 7 is a schematic of a second conventional wavelength conversion device for second harmonic generation.

In the prior-art second-harmonic generation system of external resonant-type as shown in FIG. 7, the laser light source 10 oscillates independently of the external resonator 30. However, as the distance between the mirrors 31 and 32 in the external resonator 30 must be adjusted precisely on an order of microns, this system requires a complex and expensive regulating mechanism using piezoelectric elements, and a setting may be easily upset by temperature variations or very small shocks. Furthermore, the laser light source 10 usually oscillates the laser light L1 in a multi-longitudinal mode, and since there is no alternative to synchronizing the external resonator 30 with the wavelength component of a specific mode, the wavelength components in other modes are wasted, thereby leading to a reduction in the effective wavelength conversion efficiency. Therefore, its application is difficult in cases where high-power output is required, especially in processing applications, where it is necessary to completely utilize the many modes generated by the laser light source 10.

Figure 8:
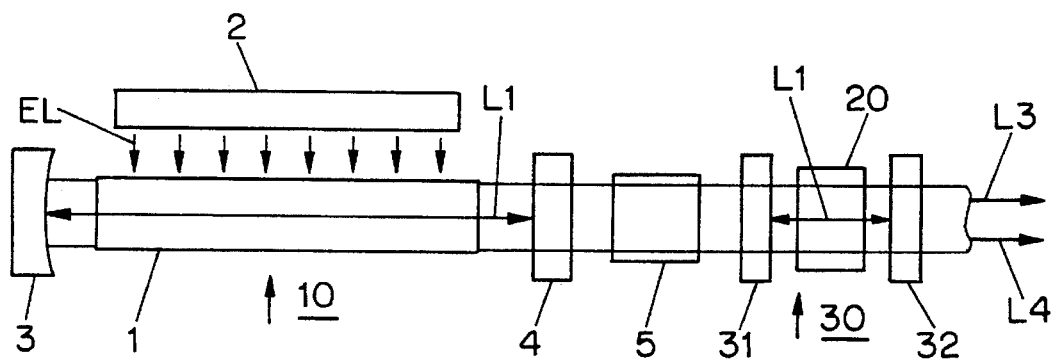
FIG. 8 is a schematic of a conventional wavelength conversion device using optical parametric oscillation.

In the prior-art optical parametric oscillation system shown in FIG. 8, it is difficult to achieve a stable wavelength conversion which will convert the laser light L1 into the laser light L3 and laser light L4 while also satisfying the phase-matching condition described earlier. It is also difficult to provide mirrors 31 and 32 with a reflectivity or transmittance with wavelength selectivity suitable for the three wavelengths (including the laser light L1) that are handled by the external resonator 30. Thus, even though this doubly resonant optical parametric oscillation system has an intrinsically high wavelength conversion efficiency, this system is actually used only for a single wavelength conversion.

Furthermore, although all of the systems of the prior art increase the intensity of the injected laser light L1 by means of an internal or external resonator, the intensity of the second-harmonic polarization in the medium 20 is much lower than that of the fundamental polarization. It is believed to be difficult to raise the intensity of the laser light L1 using only the resonators to further improve the wavelength conversion efficiency. In light of these considerations, an objective of the present invention is to further raise wavelength conversion efficiency and to stabilize the conversion operation.

The present invention uses an unstable optical resonator that functions inversely. Although an unstable optical resonator cannot confine light permanently, as the light injected into the optical resonator eventually escapes, it can let the light reside or concentrate in a reciprocal light path between the mirrors close to the optical axis in the optical resonator before the light escapes, by disposing a pair of confocal curved mirrors in the optical resonator, and by injecting the input laser light parallel to the optical axis. High intensity of the laser light near the optical axis results in enhanced wavelength conversion efficiency.

In addition, because in such an unstable optical resonator the light wave front does not necessarily coincide with the curved face of the mirrors, light reciprocating between the mirrors may undergo cancellation near the optical axis where the input laser light concentrates, creating a site where the light intensity is decreased. However, since the length of the reciprocating light path changes according to its distance from the optical axis, reciprocating light may undergo strengthening near the optical axis, creating a site with higher light intensity. Thus, even if the input laser light has a certain wavelength range as a result of oscillation in a multi-longitudinal mode, light with all of the wavelength components necessarily concentrates around the optical axis and contributes to wavelength conversion. Thus, the present invention can raise the effective wavelength conversion efficiency and increase the intensity of converted laser light. Furthermore, since this does not require the mirror surface to coincide with the wave front of the input laser light, the distance between the mirrors need not be finely and closely set, but can be adjusted during device operation to stabilize wavelength conversion.

Explanations are given hereunder to the embodiments of the present invention with reference to the drawings. FIGS. 1 through 4 show different embodiments in which a wavelength conversion device of the present invention is used for second harmonic generation, and FIG. 5 illustrates a wavelength conversion device applied to a light parametric oscillation system. These wavelength conversion devices receive the input laser light L1, which has a wavelength of 1.06 μm, for example, and which is pulse-oscillated in a normal multi-longitudinal mode or continuously oscillated from a laser light source 10 as shown in FIG. 7 or FIG. 8, for example.

Figure 1:
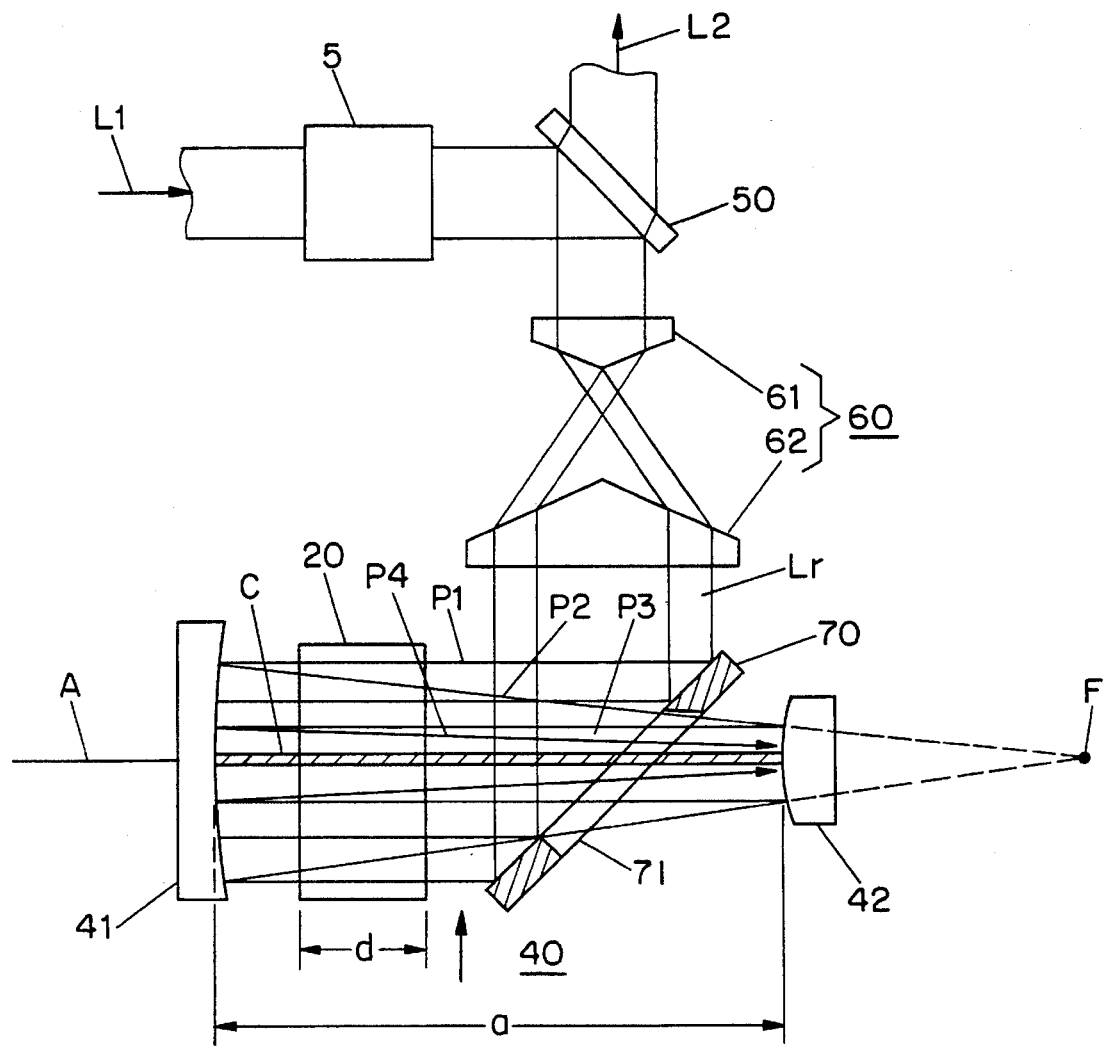
FIG. 1 is a schematic of a first embodiment of the present invention applied to a second-harmonic generation system.

In the first embodiment, which is shown in FIG. 1, the input laser light L1 is injected into an optical resonator 40 as an annular beam Lr, and the converted laser light L2 is removed through an inverse path. The beam of laser light L1, which is injected from the laser light source through an isolator 5, is bent 90 degrees by a separator 50, a separation filter for the converted laser light L2, and is then converted to the annular beam Lr by a beam converter 60 with two conical lenses 61 and 62 facing each other. An annular mirror 70 disposed in the optical resonator 40 in a slanted position receives this annular beam Lr, changes its travelling direction so that it is parallel with optical axis A, and then admits the beam into the optical resonator 40.

The optical resonator 40 in this embodiment includes a concave mirror 41 and a convex mirror 42. The mirrors 41 and 42 have the same focal point F and optical axis A, they are formed in an axially symmetric spherical or parabolic face, and they are coated with a coating that has a high reflection factor for the laser light L1 and the laser light L2. In this embodiment for second harmonic generation, a nonlinear optical medium 20 made of lithium niobate, or the like, is cut to satisfy the phase-matching condition, $n_1=n_2$, where $n_1$ is the refractive index for the laser light L1 (the fundamental wave), and $n_2$ is the refractive index for the converted laser light L2 (the second harmonic), and is inserted into a light path between the curved mirrors in the optical resonator 40. In this type of insertion using a nonlinear optical medium 20, the distance "a" between the mirrors is set to satisfy the equation $a=(R_n-R_p)/2+d(n_1-1)/n_1$, where $R_n$ is the radius of curvature of the concave mirror 41, $R_p$ is the radius of curvature of the convex mirror 42, and d is the length of the nonlinear optical medium 20 in the direction of the optical axis.

FIG. 1 shows the paths for the laser light L1, which is injected into the optical resonator 40, with designations P1 through P4. The laser light L1 is injected into the outer circumference of the concave mirror 41 at a light path P1 parallel with the optical axis A after it reflects on the annular mirror 70, and thereafter goes to the right on a light path P2, which is the path to the focal point F, goes to the left on a light path P3 parallel to optical axis A, and then returns to the right on a light path P4, which is the path to the focal point F. At each reciprocation between the mirrors 41 and 42, the light gets closer to the optical axis A, and as a result, the laser light L1 is concentrated at a high optical intensity around the optical axis A in the optical resonator 40 at concentration part C in FIG. 1. There, the wavelength of the light is converted at a high efficiency to that of the converted laser light L2 through the nonlinear optical medium 20.

Since the laser light L1 is diffracted at concentration part C, the components that have not contributed to the wavelength conversion pass through light paths P1 through P4 described above, and gradually escape outside. The optical resonator 40 is unstable in this sense, and the present invention utilizes this aspect to concentrate the laser light L1 to the vicinity of the optical axis A. This embodiment also utilizes this unstable configuration to remove the converted laser light L2 through the nonlinear optical medium 20, wherein the converted laser light L2 is guided to the separator 50 via the inverse paths to admit the laser light L1 and is then removed externally as shown in FIG. 1. This embodiment advantageously provides for nearly perfect reflectivity of the mirrors 41 and 42, thereby minimizing losses in the optical resonator 40 and raising the wavelength conversion efficiency.

As can be understood from the first embodiment described above, the laser light L1 can be concentrated to concentration part C close to the optical axis A to raise the light intensity by having the curved mirrors 41 and 42 in the unstable optical resonator 40 share the focal point F, and by injecting the laser light L1 into the optical resonator 40 at locations other than the optical axis A from a direction parallel to the optical axis A, where if one of the mirrors is concave and the other is convex as in this embodiment, the laser light L1 is injected into the concave mirror 41. The window 71 of the annular mirror 70 in this embodiment allows passage of the laser light L1 first reflected on the concave mirror 41.

Figure 2:
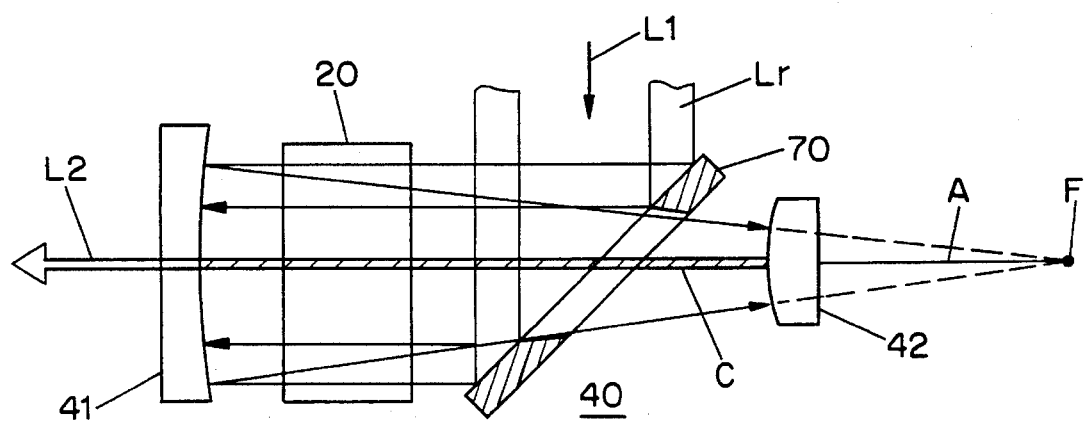
FIG. 2 is a schematic of a second embodiment of the present invention applied to a second-harmonic generation system.
Figure 3:
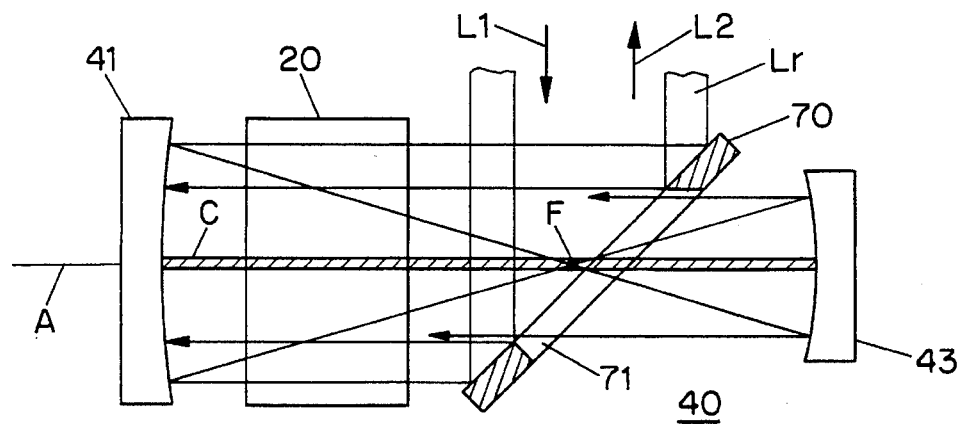
FIG. 3 is a schematic of a third embodiment of the present invention applied to a second-harmonic generation system.

In a second embodiment, shown in FIG. 2, the converted laser light L2 is removed through one of the two curved mirrors in the optical resonator 40, e.g., through the concave mirror 41 as shown. This design is similar to the first embodiment, and FIG. 2 shows only the parts around the optical resonator 40 where the laser light L1, converted into the annular beam Lr by a beam converter 60 in FIG. 1, is injected into the optical resonator 40 via the annular mirror 70. In this embodiment, the mirror 41, which removes the converted light L2, is provided with a wavelength selective reflectivity that has high reflectivity for the laser light L1 and high transmittance for the converted laser light L2, whereby the converted laser light L2 generated as the second harmonic by the nonlinear optical medium 20 is removed, immediately upon generation, through the concave mirror 41. This converted laser light L2, which is generated from concentration part C in the laser light L1, is removed in the form of a light flux which is nearly parallel. This second embodiment does not require a separator 50 shown in FIG. 1.

In the embodiments shown in FIGS. 1 and 2, the two curved mirrors in the optical resonator are of an external focus type, with a coupled concave face and convex face. In a third embodiment, shown in FIG. 3, two concave mirrors 41 and 43 of an internal focus type are included in the optical resonator 40, having a common focal point F. Other parts are the same as in FIG. 1, with the laser light L1 passed to the optical resonator 40 in the form of the annular beam Lr via the annular mirror 70, and the converted laser light L2 removed through the inverse path. Similarly also, the mirrors 41 and 43 have a high reflectivity, and a window 71 in the annular mirror 70 is formed so as to allow passage of the first reflection of the laser light L1 on one mirror 41 and the second reflection on the other mirror 43. Since the light path change is so great relative to the deviation from the optical axis A in this embodiment, making concentration part C narrower is more advantageous for raising the intensity of the laser light L1.

Figure 4:
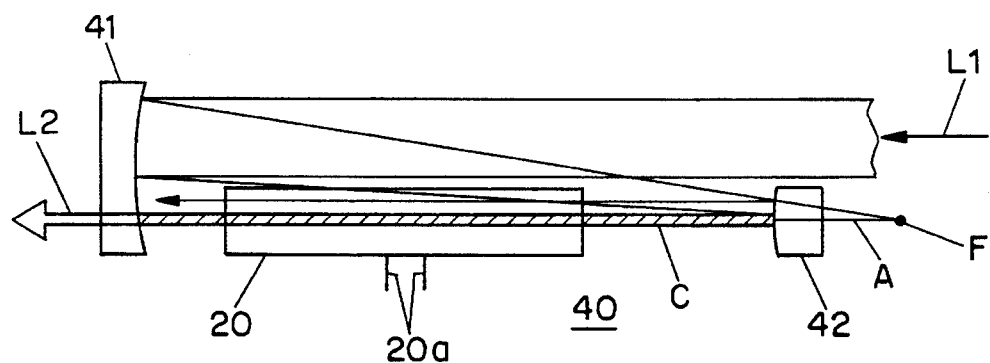
FIG. 4 is a schematic of a fourth embodiment of the present invention applied to a second-harmonic generation system.
Figure 5:
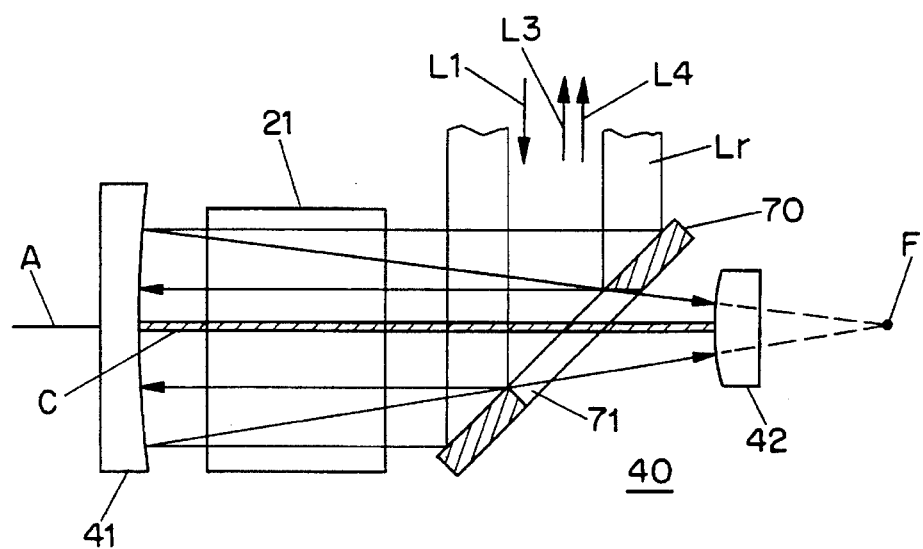
FIG. 5 is a schematic of an embodiment of the present invention applied to a light parametric oscillation system.

A fourth embodiment, which is shown in FIG. 4, is not intended for high output use, but offers an advantage in that it has a simple construction. The external focus F for the concave mirror 41 and the convex mirror 42 is set closer to the latter mirror to reduce its diameter, wherein the laser light L1 is injected into the part of the outer circumference of the concave mirror 41 corresponding to the difference in the diameter parallel to optical axis A. A small rod supported by a support 20a of the nonlinear optical medium 20 is inserted into the light concentration part C of the laser light L1. Since this embodiment requires the converted laser light L2 to be removed from one of the mirrors, the concave mirror 41, for example, is coated with a wavelength selective coating to provide the laser light L1 with high reflectivity, and the converted laser light L2 with high transmittance. In this embodiment, the separator 50, the beam converter 60, and the annular mirror 70 of FIG. 1 are eliminated. Although only some areas of the mirrors 41 and 42 are used in this embodiment, it has a high degree of laser light L1 concentration on concentration part C despite its simple construction, and it provides a higher wavelength conversion efficiency than conventional systems.

FIG. 5 shows an embodiment using light parametric oscillation. Its construction is like that shown in FIG. 1, and the nonlinear optical medium 21 is cut to satisfy the phase-matching condition of the light parametric oscillation described with reference to FIG. 8, wherein converted laser light L3 and converted laser light L4 are removed through a path inverse to the path through which the laser light L1 is injected. In this arrangement, the separator 50 in FIG. 1 is provided with wavelength selectivity for separating the laser light L3 and laser light L4 from the laser light L1. Since, in this embodiment, it is desirable that the two mirrors 41 and 42 in the optical resonator 40 are provided with a high reflectivity to each one of laser light L1, L3 and L4, the practicality of using light parametric oscillation to convert two wavelengths in laser light L3 and laser light L4 is enhanced.

In light parametric oscillation for converting two wavelengths according to this embodiment, three kinds of laser light L1, L3 and L4 coexist in the vicinity of the optical axis A in the optical resonator 40 and are concentrated on concentration part C at high intensities. The amplifying action to the converted laser light L3 and laser light L4, in the nonlinear optical medium 21, is enhanced by interaction of the three waves, characteristic of light parametric oscillation. As a result, wavelength conversion efficiency is very high. Furthermore, it also becomes possible to continuously convert the wavelengths of the laser light L3 and laser light L4 by rotating the nonlinear optical medium 21 around the optical axis A.

The wavelength conversion devices according to the present invention described above have the following effects:

(a) The efficiency of laser-light wavelength conversion by means of second-harmonic polarization in a nonlinear optical medium is enhanced, as input laser light is concentrated in the vicinity of an optical axis at a high optical intensity when an unstable optical resonator is used, having a pair of curved mirrors with the same focal point, and input laser light is injected in a direction parallel to the optical axis.

(b) The practicality of the device is enhanced by eliminating the need to closely adjust the distance between the mirrors in the optical resonator, as is required in conventional devices, because the unstable optical resonator does not require matching of mirror faces with the wave front of input laser light. Furthermore, the need for adjustments due to temperature changes during device operation, or due to external vibration and shocks is reduced. Thus, device operation is especially stable.

(c) Because it is possible, even when input laser light has a wavelength distribution oscillating in a multi-longitudinal mode, to concentrate all of the wavelength components in that distribution around the optical axis in the unstable optical resonator at high intensity, the wavelength conversion efficiency is effectively improved by efficiently utilizing all the wavelength components for the wavelength conversion. Furthermore, this allows the converted laser light to be output at a high rate, which makes it easier to use the device in processing applications.

(d) In the case of light parametric oscillation, since it is possible to raise the optical intensity by concentrating the input laser light around the optical axis while satisfying the conditions for converting a wavelength to two laser-light wavelengths, the practicality of light parametric oscillation is enhanced, and high wavelength conversion efficiency is achieved as the light parametric oscillation exhibits its inherent characteristics. Furthermore, because all of the mirrors in the optical resonator are capable of total reflection, an optimal oscillating condition for conversion of a laser-light wavelengths to a wide range of wavelengths can be easily satisfied.

While the above is a description of the invention in preferred embodiments, various modifications, alternate constructions and equivalents may be employed, as the above description and illustrations should not be taken as limiting the scope of the invention which is defined by the appended claims.

I claim:

1. A wavelength conversion device including an unstable optical resonator and an optical input/output means to and from the optical resonator,
  wherein the optical resonator comprises:
    first and second concave mirror means which have different curvatures and which are configured and disposed so that the optical axis and the focal point of the first concave mirror means respectively coincide with the optical axis and the focal point of the second concave mirror means; and
    a nonlinear medium disposed between the two concave mirror means for converting first light comprising a first wavelength to second light comprising a second wavelength different from the first wavelength;
  wherein the two concave mirror means and the nonlinear medium are configured and disposed so that light initially comprising the first light falls from the optical input/output means onto the first concave mirror means, repeatedly is reflected between the two concave mirror means so as to pass through the nonlinear medium for conversion to comprise the second light, and then returns to the optical input/output means; and wherein the optical input/output means comprises an annular mirror means disposed between the two concave mirror means for injecting the first light as a first annular luminous flux into the optical resonator and for reflecting the second light as a second annular luminous flux out of the optical resonator.

2. A wavelength conversion device including an unstable optical resonator and an optical input/output means to and from the optical resonator, wherein the optical resonator comprises:

first and second concave mirror means which have different curvatures; and a nonlinear medium disposed between the two concave mirror means for converting first light comprising a first wavelength to second light comprising a second wavelength different from the first wavelength;

wherein the two concave mirror means and the nonlinear medium are configured and disposed so that light initially comprising the first light falls from the optical input/output means onto the first concave mirror means, repeatedly is reflected between the two concave mirror means without intermediary reflection and to be concentrated in a reciprocal light path between the two concave mirror means and so as to pass through the nonlinear medium for conversion to comprise the second light, and then returns to the optical input/output means; and wherein the optical input/output means comprises an annular mirror means disposed between the two concave mirror means for injecting the first light as a first annular luminous flux into the optical resonator and for reflecting the second light as a second annular luminous flux out of the optical resonator.

* * * * *